Sept. 1, 1970    C. M. SCHOTT, JR    3,526,563
FORMATIONS IN CONTINUOUS LENGTH MATERIALS
Filed Oct. 10, 1966    2 Sheets-Sheet 1

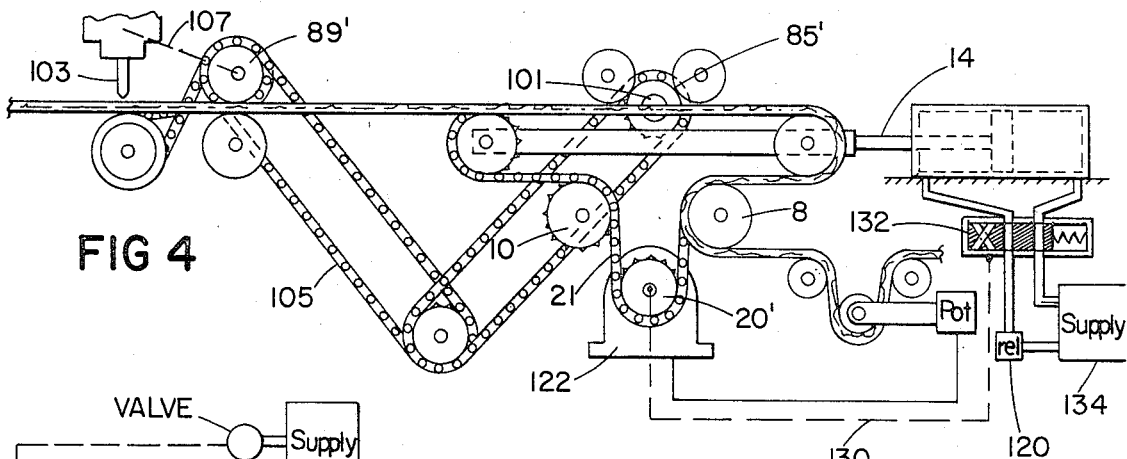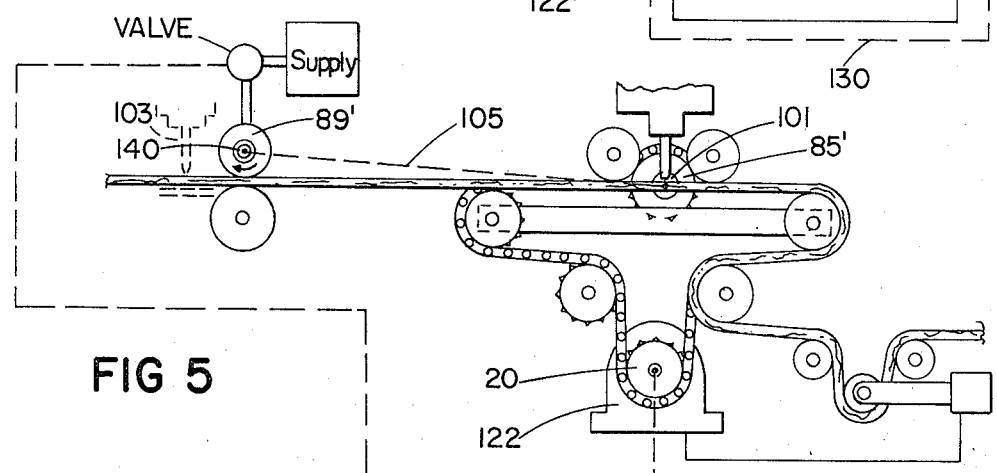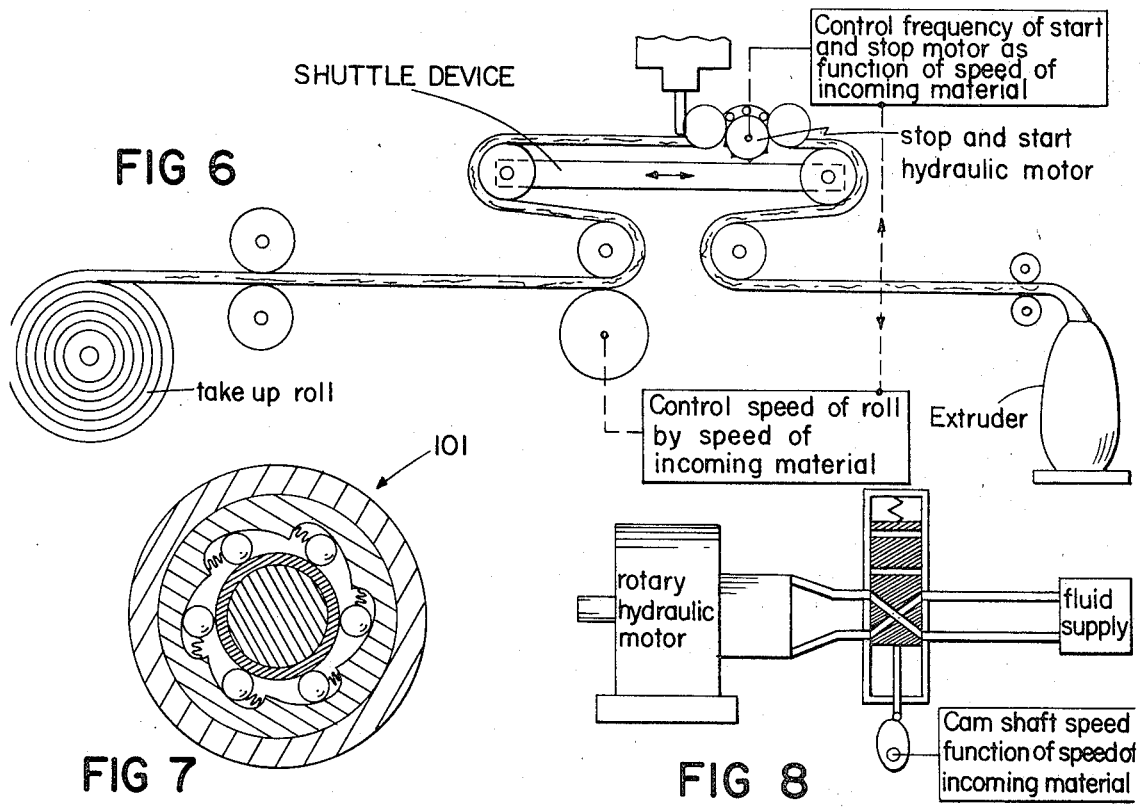

United States Patent Office 3,526,563
Patented Sept. 1, 1970

3,526,563
FORMATIONS IN CONTINUOUS
LENGTH MATERIALS
Charles M. Schott, Jr., Gloucester, Mass., assignor to
Gloucester Engineering Co., Inc., Gloucester, Mass., a
corporation of Massachusetts
Continuation-in-part of applications Ser. No. 251,327,
Jan. 14, 1963, and Ser. No. 430,804, Feb. 8, 1965.
This application Oct. 10, 1966, Ser. No. 585,623
Int. Cl. B30b 15/34
U.S. Cl. 156—583                 19 Claims

ABSTRACT OF THE DISCLOSURE

Machines for imparting formations to materials supplied continually featuring braking and hydraulic motor controls.

---

This application is a continuation-in-part of my co-pending applications Ser. No. 251,327, filed Jan. 14, 1963, entitled "Machine for Altering Moving Webs," now U.S. 3,322,604, and Ser. No. 430,804, filed Feb. 8, 1965, entitled "Bag Machine," now U.S. 3,361,614.

The general object of the invention is to provide an improved machine for making formations in or upon material being fed continually to the machine, and with especial regard to the material control problems encountered with formation of plastic articles with heating dies from a continuous supply of plastic, e.g. from an extruder.

A particular object is to provide a machine of extreme reliability, while of no greater expense than prior machines, to the end that the articles can be formed in-line, e.g. with the machine which produces the starting material, and without danger that operation of the machine will impair the necessary continuity of operation of the preceding or following machine.

In particular, an object of the present invention is to produce severed bags or deliver segments of webs intermittently from a continuously moving web source, or more generally to provide a unique means for synchronized acting upon a web while having the input continuous and the output intermittent.

In one aspect of the invention, rather than a double rolled shuttle acting upon the material, a single rolled shuttle is employed, and synchronized therewith is an intermittent device that moves the web intermittently, with a unique interdependency between the devices obtained by a belt or chain linkages.

In another aspect of the invention it is realized that by the combination of a hydraulic drive, and the use of a brake, and especially a simple single-direction mechanical clutch, as the control element for the hydraulic drive, highly accurate repeat lengths can be obtained in an extremely simple machine. It is realized that broadly this principle is applicable to hydraulic motors of various descriptions, not only the hydraulic pistons as described in the parent applications, but also in some and important instances, rotary hydraulic motors. While it is realized that the rotary motor can be employed as above, and in unique shuttle arrangements, it is also realized that the motor alone, with other controls and with other arrangements for prior accumulation of the received material, can be employed to advantage.

The above and other objects and features of the invention will be understood from the following by those familiar with the art.

In the drawings:

FIG. 4 is a drawing depicting preferred embodiment of the present invention, similar to FIG. 1, but incorporating a unique brake arrangement;

FIG. 5 is a drawing similar to FIG. 4 of another preferred embodiment employing a rotary hydraulic motor;

FIG. 6 is a somewhat diagrammatic view of a second web path adapted for use with the embodiment of FIG. 5;

FIG. 7 is a cross-sectional view of a typical single direction clutch capable of use according to the invention;

FIG. 8 is a schematic view of a valving arrangement capable of use according to the present invention.

Figure 1:
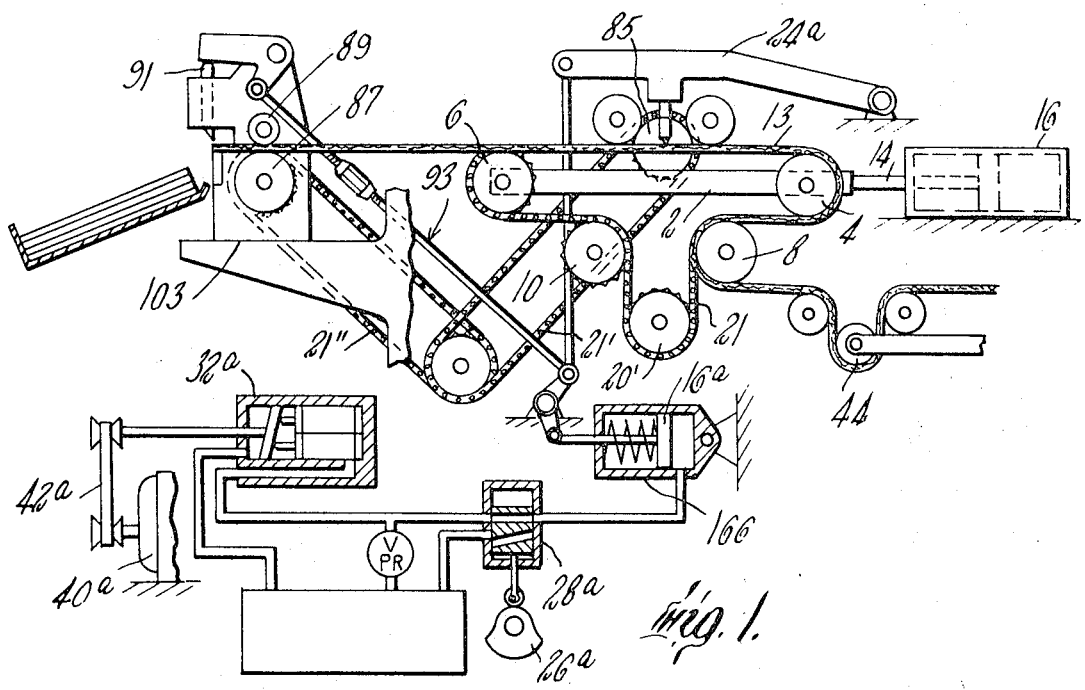
FIG. 1 is a drawing depicting the machine shown in the parent application, now U.S. 3,361,614, embodiment adapted to produce an intermittent output.
Figure 2:
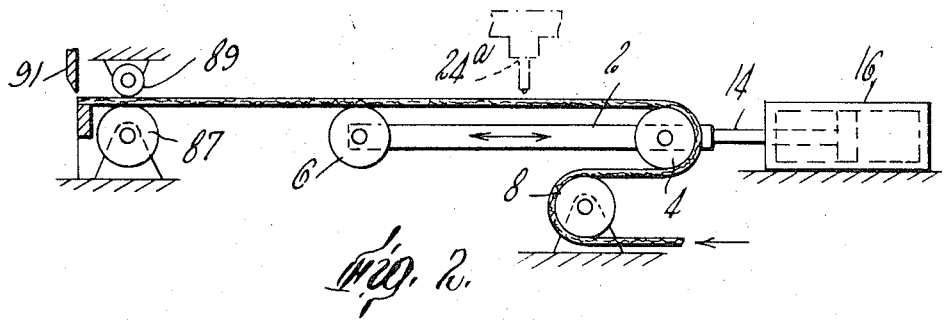
FIG. 2 is a somewhat diagrammatic view of the web path of the embodiment of FIG. 1.
Figure 3:
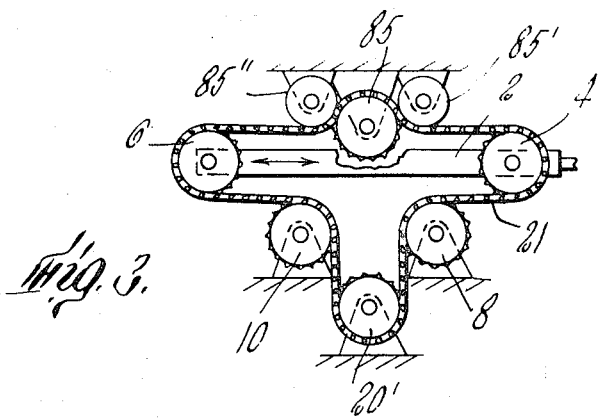
FIG. 3 is a somewhat diagrammatic view of the belt path of the embodiment of FIG. 1.

Referring to FIGS. 1–3, the driving belt 21 is trained through a loop similar to that of FIG. 1 or 10 of the parent application mentioned above, to which reference is made.

Referring to FIGS. 1 and 2, the web 13 after being formed into a loop about shuttle roll 4, and passing under the reciprocal altering device 24a does not loop around the second shuttle roll 6, but rather it extends across the top of that roll to a pair of rolls 87 and 89 that from a nip. The web proceeds through this nip to a cutting head 91 at which the web is periodically cut into separated pieces.

It will be understood, from the teachings of the parent application, U.S. 3,361,614, that when the shuttle roll 4 proceeds in the direction to the right at one half the speed at which the web is being fed to the machine at roll 8, the web extending from shuttle roll 4 across roll 6 to the nip 87, 89 is stationary, and at that time the cutting head can be actuated by mechanism 93 to cut the stationary web. Then when the shuttle roll proceeds in the direction to the left, to return to its initial position, the film extending from shuttle roll 4 to cutting head 91 moves rapidly, being pulled by the pair of rolls 87, 89, causing the next section of web to move past the cutting head until the shuttle again reverses direction.

It is, however, essential that the roll nip 87 and 89 be driven in direct relation to the action of the shuttle. For this purpose the timing belt 21 is trained about both shuttle rolls 4 and 6 so that the part of the belt extending between shuttle rolls 4 and 6 at all times corresponds exactly in surface speed to that of the film, stopping when the shuttle moves to the right and moving very fast when the shuttle moves to the left. A sprocket wheel 85 is driven by this span of belt, between shuttle rolls 4 and 6, and two idler pulleys 85' and 85" are provided to maintain the timing belt engaged with sprocket 85, and to keep the belt parallel to the direction of movement of the shuttle as it approaches and leaves sprocket wheel 85, these details being shown in FIG. 3. Referring to FIG. 1, second and third timing belts 21' and 21" are driven by sprocket 85 and in turn drive roll 87, thus making the surface speed of the roll 87 exactly correspond to the speed of the film produced by the shuttle rolls, stopping and starting in synchronization. The top roll 89 can be very light in weight, and driven only through the frictional contact, as shown, or it can be driven by roll 87 through a separate driving belt, not shown.

The position of the cutting head 91 relative to the roll 6 can be varied along slide 103 when the distance between cuts is to be varied and the mechanism 93 that actuates the cutting head 91 can be driven by the same means that actuates altering device 24a.

In this machine the reciprocating die is not actuated directly by a cam, but rather through a hydraulic link. Referring to FIG. 1, cam 26a turned at a speed dependent upon that of the arriving film actuates valve 28a which opens and closes single acting piston 16a to a source of pressurized hydraulic fluid 32a. When opened to the fluid, the piston 16a moves to the left, against the action of the spring, pressing the die against the web. When closed, the fluid drains out and spring 16b returns the die. One particular advantage of this arrangement is that the pressure exerted by the die can be regulated by changing the setting of the relief valve without having to change the form of the cam 26a.

Also, by regulating the speed of the pump the time elapsed during downward travel of the die, relative to the time of the entire cycle, can be varied, thereby giving a control for the time the die engages the film.

It will be understood that the web can be fed into the machine continuously while separated bags are moved out of the machine at intervals corresponding to the frequency of operation of the shuttle.

More generally, it will be appreciated that by synchronizing a web locking device with a single shuttle roll, and operating upon the web in between these devices, particularly in combination with hydraulic control, provides an improved means of operating upon plastic webs.

Referring to the embodiment of FIG. 4, the essential difference over the machine of FIG. 1 is the novel employment of a brake as an over-control of a hydraulic motor, for ensuring the proper stoppage of the web. In this embodiment the take-off sprocket 85' from the shuttle belt 21' is mounted on a shaft with a single-direction clutch 101 (see FIG. 7) in the manner that the clutch permits free movement of the sprocket in the counterclockwise direction, but brakes against rotation in the clockwise direction. This braking action is transmitted by the sprocket through the drive linkage 105 to the nip roll 89', and ensures that the web protruding from roll 89' to the heating and forming die 103 is stationary when the die, synchronized by linkage 107, comes down. This braking action overcomes any inertial or other tendency for producing erratic movement of the web, and thus assures a more accurate repeat length for the operation. Such greater accuracy has many benefits, for instance better registry control for printing, more accurately shaped bags for use with automatic machinery, and more efficient use of the starting material.

The clutch 101 acts also to brake the upper run of the timing belt, and thus acts to restrain or retard the movement of the piston 14. A relief valve 120 is associated with the fluid supply to the hydraulic motor, and during the braking action felt by the piston from the clutch, the relief valve normally operates to remove the excess fluid from the line.

It is important to realize that during the crucial portion of the forming cycle, when the web is stationary at the die, the piston moves only as fast as the belt permits. However the portion of the belt unaffected by the brake, i.e. the belt lying between the stationary-axis rolls 10 and 8, is driven at the speed of the incoming web by means of drive motor 122 which is controlled by the potentiometer to correspond to the speed of the incoming web. Thus the more web that reaches the machine, the more belt is passed out by the drive sprocket 20', and the piston is permitted to move just the correct distance by this feed of belt, to take up all incoming web.

The repeat length control shaft 130 constitutes a mechanical linkage between the belt drive motor and the control valve 132. With a predetermined amount of rotation of the shaft, corresponding to a predetermined length of material flowing into the machine, the hydraulic valve reverses, and the piston is driven in the reverse direction. Now freed from the restraint of the clutch, the piston operates with a full amount of hydraulic fluid suppled to it by the pump 134. This amount can be substantially in excess of the amount used by the piston in the take-up travel, thus permitting a much more rapid movement of the shuttle device on its return stroke, which has the very important virtue of permitting a higher rate of production.

It will be understood that other braking mechanisms can be employed, but the single direction clutch, such as that shown in FIG. 7 is very simple, inexpensive and reliable. One possible clutch for this purpose is the model No. RCB–162117, of the Torrington Company, Torrington, Conn.

In addition or instead of positioning the clutch upon the take-off sprocket shaft, it can be positioned on the nip roll shaft 89' or any other positive acting sprocket in the drive train.

Referring to the embodiment of FIG. 5, a single direction clutch 101 is associated with the sprocket 85', by linkage 105, connected to nip roll 89'.

To control the proper positioning of the web a rotary hydraulic motor 140 is drivingly associated with the nip roll 89'. A suitable motor of this type would be the Vickers MFB–5. As indicated also in the FIG. 8 the operation of the hydraulic motor is controlled by linkage in accordance with the speed of the web. It is possible to drive the motor only when it is desired to feed out the web from the machine, and to stop it by closing off both intake and exhaust when it is desired to stop the web. This can have a braking effect similar to that of the clutch, and is possible for use with web accumulators of types other than the preferred shuttle device, e.g. a free-floating dancer roll. Advantageously, however, the rotary hydraulic motor is employed with the shuttle device, and in a manner in which, although it is a rotary member, it controls the reciprocation of the shuttle device.

Referring to FIG. 5, it is seen that the hydraulic motor 140, and if not that, then the clutch 101 is effective to brake the upper run of the belt. The belt drive 20 however is continually rotated in accordance with the speed of the incoming web, which has the effect of drawing the belt from the left side of the shuttle device and feeding it to the right hand side. With the shuttle device free floating on its tracks, the action of the belt has the accurate effect of propelling the shuttle to the right at the desired speed. When the control valve is reversed in the manner previously described, the hydraulic motor is caused to rotate to drive the nip at a surface speed greater, advantageously more than twice as great, as the speed of the incoming web. This not only feeds the web out of the machine. Through linkage 105 the upper run of belt is driven by sprocket 85' to the left, and with the web feed motor 122 still turning at the speed of the incoming web, the shuttle is propelled in the desired direction to the left at the correct speed.

Referring to FIG. 6 it will be seen that the use of the rotary hydraulic motor is not limited to an intermittent output machine, but also can provide a continuous output machine.

It has been mentioned that with the mere closing of the inlet and exhaust in the hydraulic supply to the hydraulic motor, a braking action can be obtained. It is a feature of the invention, however, that the hydraulic motor is combined in the drive train with a brake, e.g. the single direction clutch as shown in FIG. 5. With this arrangement, when it is desired to stop the motor and the web, instead of closing off the ports, a positive pressure of fluid is supplied to the normal exhaust port, thus tending to reverse the direction of movement of the hydraulic motor. However the single direction clutch immediately acts to prevent such rotation, and the excess pressure is relieved by a relief valve, or, if the pump is of the pressure control type, it relieves itself. The very important advantages that are believed to follow are a more positive stoppage, prevention of overtravel of the hydraulic motor, and a positive compensation for any wear or leakage that may occur. Thus a highly accurate repeat length can be obtained.

In the foregoing embodiments it is an important feature that the belt (including timing belts and chains)

follows the same pitch path as the web through the shuttle device, hence when the web stops the belt stops.

The die 103 is advantageously a heating die for plastic, either a heated die, as may be used for vacuum forming, or one of the other types of dies, which perhaps not heated itself, causes the plastic to soften and permits it to be formed.

Especially in connection with the rotary hydraulic valve, other means can advantageously be employed to modify the exhaust conditions to adapt the motor to the production of plastic articles in accordance with the invention. Thus, instead of quick closing of the supply valve for stoppage of the web, the valve should be shaded, i.e. adapted to close off the fluid gradually, an especially important provision in the high speed environment to provide for proper deceleration. It will also be appreciated that an equivalent to closing and opening of valves is the tilting back and forth of the swash plate in the appropriate style of rotary hydraulic motor. In either event a mechanical linkage for the repeat length is a great advantage, according to the invention.

What is claimed is:

1. A machine for periodically imparting a formation to a running length of material as the material is fed continuously to the machine, the machine having guiding means defining a path for the material, forming means adapted to impart a formation to said material, a take-up and pay-out device for material in advance of said forming means, and a control means for causing the periodic stoppage of the material at the proper locations relative to said forming means, said control means comprising the combination of a hydraulic motor, a fluid supply means for alternately supplying hydraulic fluid to said motor in different drive directions, and a brake means adapted to restrain said motor in moving in one direction corresponding to the forming portion of the cycle of the machine to cause stoppage of said material at said forming means, and said fluid supply means including pressure control means adapted to accommodate the stoppage of said motor.

2. The machine of claim 1 wherein said brake means comprises a single-direction mechanical clutch.

3. The machine of claim 1 wherein said hydraulic motor drives one of a pair of nip rolls adapted to intermittently pull the material through the machine and to stop the material, and said brake means is adapted to permit rotation of said roll in the pulling direction while preventing rotation in the opposite direction.

4. The machine of claim 3 wherein said motor is a rotary hydraulic motor, and said brake is adapted to prevent rotation of said motor in one direction.

5. The machine of claim 3 wherein said nip roll is connected in a drive train to an endless belt in a shuttle device, the shuttle device adapted to start and stop a portion of said belt interdependently with said nip roll, said brake adapted to insure stoppage of said portion of belt, said portion of said belt arranged to drive guide rolls engaged with the starting and stopping material interdependently with said nip rolls.

6. The machine of claim 5 wherein said hydraulic motor comprises a hydraulic piston drivingly connected to said shuttle device, and adapted to be forced back and forth within a hydraulic cylinder under the influence of said fluid supply, stoppage of said belt portion adapted to retard the movement of said piston.

7. The machine of claim 5 wherein said motor is a rotary hydraulic motor drivingly associated with said portion of said belt which stops, and a second drive means adapted to engage and continuously drive a portion of said belt not moved by said shuttle device, whereby, upon stoppage of said belt portion controlled by said brake, said second drive means by continuing to drive said belt is effective to drive said shuttle device.

8. The machine of claim 1 wherein said take-up and pay-out means comprises at least one roll mounted on a shuttle device, an endless belt associated with said shuttle device the shuttle device adapted to start and stop a portion of said belt interdependently with the action of said forming means, said brake during the action of said forming means adapted to lock said portion of belt against movement and restrain said motor.

9. The machine of claim 8 wherein said hydraulic motor comprises a hydraulic piston drivingly connected to said shuttle device, and adapted to be forced back and forth within a hydraulic cylinder under the influence of said fluid supply, stoppage of said belt portion adapted to retard the movement of said piston.

10. The machine of claim 8 wherein said motor is a rotary hydraulic motor drivingly associated with said portion of said belt which stops, and a second drive means adapted to engage and continuously drive a portion of said belt not moved by said shuttle device, whereby, upon stoppage of said belt portion controlled by said brake, said second drive means by continuing to drive said belt is effective to drive said shuttle device.

11. In a forming apparatus for operation upon a supply of continuously moving material, a shuttle apparatus comprising a pair of rolls mounted to move together relative to stationary guides for an endless belt, whereby one of said rolls takes up the belt while the other pays it out, and vice versa, and a drive means for said shuttle device comprising means for continuously driving said belt at a position beyond the region of influence of said shuttle rolls, a periodically operating brake adapted to lock the portion of said belt lying between said shuttle rolls for one direction of travel of the shuttle device, and for motion of the shuttle device in the opposite direction of motion, means to increase the speed of the portion of said belt lying between said shuttle rolls relative to the speed of said means for continuously driving said belt.

12. The shuttle apparatus of claim 11 wherein said means for increasing the speed of said portion of said belt comprises a rotary hydraulic motor drivingly associated with said portion of said belt.

13. The shuttle apparatus of claim 11 wherein said means for increasing the speed of said portion of said belt comprises a hydraulic piston adapted to move said shuttle rolls.

14. A machine for periodically imparting a formation to a running length of material as the material is fed continuously to the machine, the machine having guiding means defining a path for the material, forming means adapted to impart a formation to said material, a web accumulator for material in advance of said forming means and a control means for causing the periodic stoppage of the material at the proper locations relative to said forming means, wherein said control means comprises the combination of a rotary hydraulic motor, means for directing hydraulic fluid to said hydraulic motor to cause it to turn in the feeding direction, means to stop said motor including means for maintaining the exhaust pressure, and means responsive to the speed of the incoming material to actuate said motor in accordance with a desired repeat length of operation upon the material.

15. The machine of claim 14 wherein said means for maintaining the exhaust pressure comprises means for admitting a supply of fluid tending to cause said motor to rotate in the opposite direction, and a single direction clutch adapted to mechanically prevent said motor from turning in said direction.

16. A machine for periodically imparting a formation to a running length of material as the material is fed continuously to the machine, the machine having guiding means defining a path for the material, forming means adapted to impart a formation to said material, a web accumulator for material in advance of said forming means, and a control means for causing the periodic stoppage of the material at the proper locations relative to said forming means, wherein said control means comprises the combination of a rotary hydraulic motor engaged to control the portion of the material that is to stop and fluid supply and valve means for said motor including means for directing hydraulic fluid through said motor to drive it in the feeding direction only, to move material past said forming means, and stopping means operable alternately with said means for directing fluid and adapted to close off the flow of hydraulic fluid through said motor, thereby to stop said motor and the material with which it is engaged, and means responsive to the speed of the incoming material to actuate said control means in accordance with a desired repeat length of operation upon the material.

17. The machine of claim 16 wherein said stopping means is adapted to close both the inlet and exhaust portions of the hydraulic fluid flow path of said motor.

18. The machine of claim 16 wherein said web accumulator comprises a shuttle apparatus mounted to move in response to movement of said rotary hydraulic motor.

19. The machine of claim 18 wherein there are a pair of rolls mounted to move together relative to stationary guides, one of said rolls located on each side of said forming means, the rolls and guides adapted to have the material trained thereabout, pulling means adapted to continuously pull said material through said machine and located at a position beyond the region of influence of said shuttle rolls, the reciprocation of said shuttle apparatus adapted to be controlled by the combined effect of the continual pull of said pulling means and the alternate rotation in one direction only and stopping of said rotary hydraulic motor.

References Cited

UNITED STATES PATENTS

| | | | |
|---|---|---|---|
| 501,603 | 7/1893 | Honiss | 83—235 |
| 2,652,879 | 9/1953 | Keller et al. | 156—583 |
| 2,667,924 | 2/1954 | Dutro | 183—113 |
| 3,084,841 | 4/1963 | Hata et al. | 226—113 |

DOUGLAS J. DRUMMOND, Primary Examiner

U.S. Cl. X.R.

83—235; 226—113